UNITED STATES PATENT OFFICE.

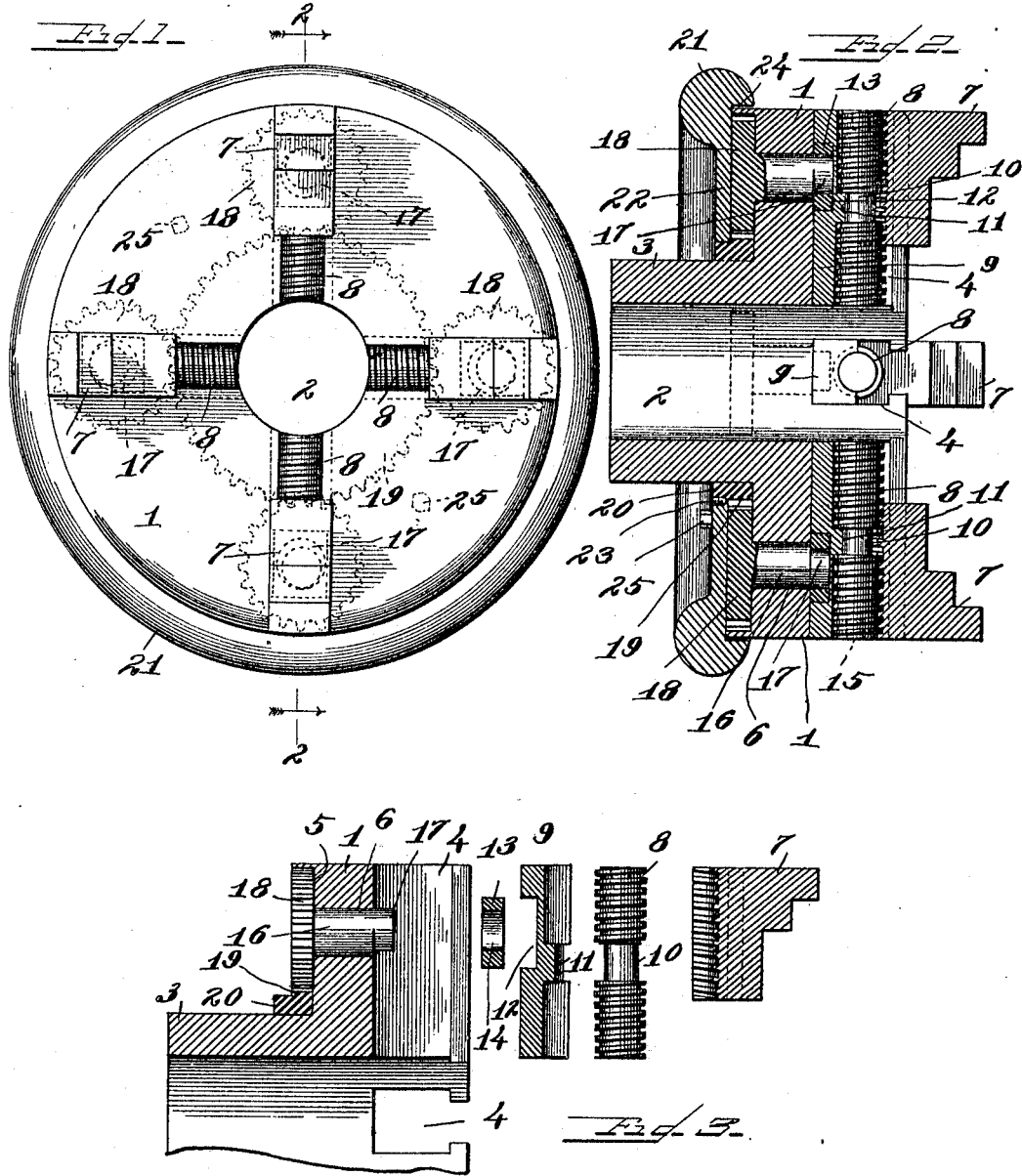

GEORGE J. BLUM, OF CHICAGO, ILLINOIS, ASSIGNOR OF ONE-HALF TO LUTHER L. MILLER, OF CHICAGO, ILLINOIS.

LATHE-CHUCK.

945,261. Specification of Letters Patent. Patented Jan. 4, 1910.

Application filed February 23, 1904. Serial No. 194,900.

*To all whom it may concern:*

Be it known that I, GEORGE J. BLUM, a citizen of the United States, residing at Chicago, in the county of Cook and State of Illinois, have invented certain new and useful Improvements in Lathe-Chucks, of which the following is a specification.

This invention relates to lathe chucks, and refers particularly to a means for quickly opening and closing the jaws of the chuck.

A further object of the invention is the production of a simple, strong and easily operated chuck, the working parts of which are incased and thus protected from injury.

In the accompanying drawings, Figure 1 is a face view of a chuck embodying the features of my invention. Fig. 2 is a transverse central section through such chuck on dotted line 2 2 of Fig. 1. Fig. 3 is a detail view of the mechanism for moving the jaws of the chuck, showing the parts of said mechanism separated to permit a more ready understanding of their construction.

In the construction of a chuck embodying the features of this invention, I provide a body portion 1 having an axial opening 2, a tubular stem 3, two or more radial, undercut jaw-receiving grooves 4 opening in the face of said body portion, a number of gear-pockets 5 formed in the rear side of said body portion and corresponding in number and position with the grooves 4, and a shaft bearing opening 6 communicating between each of said gear-pockets 5 and corresponding undercut groove 4.

A holding jaw 7 lies within each of the radial, undercut grooves 4, and is movable longitudinally thereof by means of a screw 8. The under face of the jaw is concave and screw-threaded, forming a half-nut, to correspond with the threads upon the screw 8. The screw 8 is supported in a saddle block 9, and for a portion of its length intermediate its ends is reduced in diameter in the annular channel 10, which channel is adapted to receive a projection 11 formed upon the saddle block. The face of the saddle block 9 is concave to provide a seat for the screw 8, and in its rear face is provided with a transversely extending groove 12, which groove is adapted to receive a bearing block 13 made narrower than the saddle block in order to permit of a sliding movement of the bearing block in said groove. The bearing block 13 has a central opening 14, and the screw 8 has a rectangular socket opening 15 in its outer end adapted to receive a wrench (not shown) for turning said screw and adjusting the position of the holding jaw 7.

A rotatable shaft 16 is placed in each of the bearing openings 6, and at its forward end said shaft is provided with an eccentric stud 17 adapted to lie within the opening 14 in the bearing block 13. The opposite (rear) end of the shaft 16 carries a pinion 18 fixed upon said shaft, which pinion is in mesh with a gear ring 19 rotatably supported upon the stem 3 of the body portion of the chuck, said gear ring being provided with an integral hub 20.

A hand wheel 21 having an annular web 22 is adapted to fit upon the hub 20 of the gear ring 19, and is secured to said ring in any suitable manner, as by a screw 23 seated in an opening formed partially within the hub 20 and partially within the web 22. The rim of the hand wheel is provided with an annular recess 24 upon its inner face, so formed that a portion of the rim of the hand wheel overlies the body 1 of the chuck.

The chuck hereinbefore described is intended for use where a number of duplicate pieces of work are to be operated upon. The jaws, after being set in the proper position to hold one of the pieces, may be opened and closed to release one piece and grasp another by merely turning the hand wheel 21, or, where the chuck is being rotated slowly, by merely grasping said hand wheel and holding it from rotation. In setting the chuck for the pieces it is intended to hold, the hand wheel 21 is rotated into such position that the eccentric studs 17 are thrown toward the center of the chuck. The jaws 7 are then moved into position to grasp the work, which adjustment of the jaws is accomplished by inserting a square wrench into the socket openings 15 in the outer ends of the screws 8 and rotating said screws. The jaws 7 are thus moved independently of one another. When the work is properly centered, the desired operation is performed upon it, after which it may be removed from the chuck by rotating the hand wheel 21. This rotation of the hand wheel rotates the gear ring 19, and this movement of the gear ring is transmitted to the pinions 18 which intermesh with said ring. The rotative motion of said pinions rotates the shafts 16 in their bearing openings 6 and throws the eccentric studs 17 from their position near the center of the chuck to a position nearer to the periphery thereof. This movement of the eccentric studs 17 is communicated to the saddle blocks 9 through the bearing blocks 13, which bearing blocks are moved transversely in the grooves 12 formed in the rear sides of the saddle blocks during the movement of said eccentric studs. The "throw" of the eccentric studs moves the saddle blocks 9 longitudinally within the undercut grooves 4, and by reason of the connection between said saddle blocks and the screws 8 and between the screws and the jaw 7 said jaws are moved toward and from the axial center of the chuck upon each rotation of the eccentric shafts 16.

The chuck may be used in the usual manner without change, or, if it is desired, the hand wheel 21 may be fixed with relation to the body portion 1 by inserting one or more machine bolts 25 through suitable openings in the web portion of said hand wheel into screw-threaded openings formed in the body portion 1.

In constructing this chuck the embodiment herein shown may be changed in various details without departing from the spirit and scope of my invention, wherefore I desire to have it understood that I do not limit myself to the particular form herein illustrated and described.

I claim as my invention:

1. In a chuck, in combination, a plurality of holding jaws; means for setting said jaws; an eccentric for each of said jaws for moving them independently of their movement by said setting means; a pinion for each eccentric; a gear meshing with said pinions; and means for rotating said gear relatively to said holding jaws.

2. In a chuck, in combination, a plurality of holding jaws; a screw for each of said jaws for setting the same; independent means for supporting each of said screws; an eccentric for each of said supports; and means for rotating said eccentrics.

3. In a chuck, in combination, a plurality of holding jaws; a screw for each of said jaws for setting the same; independent means for supporting each of said screws; an eccentric for each of said supports; and means for synchronously rotating said eccentrics.

4. In a chuck, in combination, a plurality of holding jaws; a screw for each of said jaws for setting the same; independent means for supporting each of said screws; an eccentric for each of said screw-supporting means; a pinion for each eccentric; and a gear for rotating said pinions.

5. In a chuck, in combination, a body portion having a plurality of radial grooves therein; a holding jaw slidably mounted in each of said grooves; a screw for setting each of said jaws, adapted to slide with its jaw; a rotatable eccentric for each of said screws for longitudinally sliding said screws in a cycle forward and backward to cause the jaws to engage and release the work; and means for rotating said eccentrics.

6. In a chuck, in combination, a body portion having a plurality of radial grooves therein; a holding jaw slidably mounted in each of said grooves; a setting screw for each of said jaws; a saddle block in each of said grooves for supporting one of said screws, each of said blocks having a transverse groove therein; a bearing block for each saddle block adapted to slide in said transverse groove; an eccentric for each saddle block having a rotative engagement with said bearing block; and means for rotating said eccentrics.

7. In a chuck, in combination, a body portion; a plurality of holding jaws; means for setting said jaws; an eccentric for each of said jaws for moving them independently their movement by said setting means; a pinion for each eccentric; a gear for rotating said eccentrics; and a hand wheel for rotating said gear, said hand wheel being of a diameter substantially equal to that of the chuck.

8. A chuck comprising a body portion; a plurality of jaws mounted to move in said body portion; a rotatable eccentric for each of said jaws for reciprocating it; and a hand wheel rotatably mounted on said body portion and connected with said eccentrics for rotating them.

9. A chuck comprising a body portion; a plurality of holding jaws; means for setting said jaws; an eccentric for each of said jaws for reciprocating it independently of its movement by said setting means; and a hand wheel rotatably mounted on said body portion and connected with said eccentrics for rotating them.

10. A chuck comprising a body portion, a plurality of jaws mounted to move in said body portion, a shaft for each of said jaws, said shaft being supported in said chuck body substantially parallel with the axis of the chuck, an eccentric on said shaft operatively connected with its jaw, a pinion on said shaft, a gear wheel meshing with all of the pinions, and means for rotating said gear wheel.

11. In a chuck, in combination, a body portion having gear pockets therein and a tubular stem; a plurality of holding jaws arranged to move radially in said body portion; setting means for said jaws; a shaft for each of said jaws, said shaft being supported in said body portion substantially parallel with the axis of the chuck; an eccentric on one end of each shaft operatively connected with its jaw for reciprocating it; a pinion on the other end of said shaft lying in one of said gear pockets; a gear wheel rotatably mounted on the tubular stem of said body portion and meshing with said pinion; and a hand wheel fixed to said gear for rotating it, said hand wheel overlying and closing said gear pockets.

12. A chuck comprising a body portion having gear pockets therein; a plurality of jaws in said body portion; means for moving said jaws, comprising pinions lying in said gear pockets; and a hand wheel for driving said pinions, said hand wheel overlying and closing said gear pockets.

GEORGE J. BLUM.

Witnesses:
L. L. MILLER,
GEORGE L. CHINDAHL.